United States Patent
Shirakawa (10) Patent No.: US 10,491,078 B2
(45) Date of Patent: Nov. 26, 2019

(54) LINEAR MOTOR HEAT DISSIPATION STRUCTURE

(71) Applicant: FUJI CORPORATION, Chiryu (JP)

(72) Inventor: Yoshihiro Shirakawa, Gamagori (JP)

(73) Assignee: FUJI CORPORATION, Chiryu (JP)

( * ) Notice: Subject to any disclaimer, the term of this patent is extended or adjusted under 35 U.S.C. 154(b) by 581 days.

(21) Appl. No.: 15/129,560

(22) PCT Filed: Mar. 28, 2014

(86) PCT No.: PCT/JP2014/059095
§ 371 (c)(1),
(2) Date: Sep. 27, 2016

(87) PCT Pub. No.: WO2015/145717
PCT Pub. Date: Oct. 1, 2015

(65) Prior Publication Data
US 2017/0141656 A1    May 18, 2017

(51) Int. Cl.
*H02K 9/22* (2006.01)
*H02K 3/18* (2006.01)
(Continued)

(52) U.S. Cl.
CPC .......... *H02K 9/22* (2013.01); *H02K 3/18* (2013.01); *H02K 41/02* (2013.01); *H02K 3/345* (2013.01); *H02K 3/521* (2013.01); *H02K 2203/12* (2013.01)

(58) Field of Classification Search
CPC ...... H02K 2203/12; H02K 3/18; H02K 3/345; H02K 3/521; H02K 41/02; H02K 9/22
(Continued)

(56) References Cited

U.S. PATENT DOCUMENTS 6,661,124 B1   12/2003  Seki et al.
7,132,774 B2 *  11/2006  Suzuki .................. H01F 5/02
                                                    310/194
(Continued)

FOREIGN PATENT DOCUMENTS

CN         101939897 A  *  1/2011  ............ H02K 3/325
EP         1 156 579 A1    11/2001
(Continued)

OTHER PUBLICATIONS

Machine translation of JP-2003164088-A, Owada (Year: 2003).*
(Continued)

*Primary Examiner* — Bernard Rojas
(74) *Attorney, Agent, or Firm* — Oblon, McClelland, Maier & Neustadt, L.L.P.

(57) ABSTRACT

A linear motor heat dissipation structure including multiple teeth arranged linearly at predetermined intervals each with coil wound around rectangular tube-shaped bobbin, and heat dissipation member provided between adjacent coils that dissipates heat generated coils by transmitting the heat to an external section. Heat dissipation member is sandwiched by bowed sections of coils that are curved outwards within edges of rectangular tube-shaped bobbin due to elastic force of coils. Accordingly, even when there are component tolerances and assembly tolerances, those tolerances are absorbed by the elastic deformation of the bowed section of coils such that the variance in the contact state between coil and heat dissipation member is made smaller so that stable and high heat dissipation performance is achieved.

4 Claims, 6 Drawing Sheets

(51) Int. Cl.
*H02K 41/02* (2006.01)
*H02K 3/34* (2006.01)
*H02K 3/52* (2006.01)

(58) Field of Classification Search
USPC .......................................................... 310/52
See application file for complete search history.

(56) References Cited

U.S. PATENT DOCUMENTS

| | | | |
|---|---|---|---|
| 2003/0098630 A1 | 5/2003 | Owada et al. | |
| 2004/0070288 A1 | 4/2004 | Seki et al. | |
| 2008/0100150 A1* | 5/2008 | Lu ............................ | H02K 9/22 |
| | | | 310/12.29 |
| 2009/0127969 A1 | 5/2009 | Okuyama et al. | |
| 2009/0322180 A1* | 12/2009 | Nonaka .................... | H02K 5/08 |
| | | | 310/215 |
| 2010/0181848 A1* | 7/2010 | Nagasaka ............... | H02K 41/03 |
| | | | 310/12.29 |
| 2015/0008769 A1* | 1/2015 | Uchitani ................ | H02K 3/522 |
| | | | 310/43 |

FOREIGN PATENT DOCUMENTS

| | | |
|---|---|---|
| EP | 2 056 427 A2 | 5/2009 |
| JP | 2001-128438 A | 5/2001 |
| JP | 2002-44932 A | 2/2002 |
| JP | 2002-112473 A | 4/2002 |
| JP | 2003-164088 A | 6/2003 |
| JP | 2004-236376 A | 8/2004 |
| JP | 2008-61458 A | 3/2008 |

OTHER PUBLICATIONS

Machine translation of CN-101939897-A, Yamanaka (Year: 2011).*
Extended European Search Report dated Feb. 28, 2017 in Patent Application No. 14886872.2.
Combined Chinese Office Action and Search Report dated Apr. 2, 2018 in corresponding Patent Application No. 201480077581.7 (with English Translation and English Translation of Category of Cited Documents), 9 pages.
International Search Report dated Jun. 3, 2014, in PCT/JP2014/059095 filed Mar. 28, 2014.

* cited by examiner

LINEAR MOTOR HEAT DISSIPATION STRUCTURE

TECHNICAL FIELD

The present application relates to a linear motor heat dissipation structure with improved heat dissipation performance.

BACKGROUND ART

Conventional linear motor heat dissipation structures are known, such as that disclosed in patent literature 1 (JP-A-2008-61458), in which a heat dissipation member such as a heat pipe is sandwiched between a coil and a bottom surface of a slot of an armature core, such that heat generated in the coil is dissipated via the heat dissipation member.

CITATION LIST

Patent Literature

Patent Literature 1: JP-A-2008-61458

SUMMARY

The linear motor heat dissipation structure of patent literature 1 above has a benefit in that heat generated in a heat source, here a coil, can be dissipated by being transmitted to the heat dissipation member directly, but because the configuration is such that a flat side surface (a surface in a direction perpendicular to the coil winding direction) of the coil stored in a slot of the armature core contacts the heat dissipation member inserted into a side surface of the slot, large variance arises in the contacting state (resistance to heat transfer) between the heat dissipation member and the flat side surface of the coil due to component tolerances and assembly tolerances, meaning there is a disadvantage of heat dissipation from the coil to the heat dissipation not being stable, and heat dissipation functionality having large variance due to component tolerances and assembly tolerances.

Therefore, an object of the present disclosure is to provide a linear motor heat dissipation structure that decreases the variance in the contact state (resistance to heat transfer) between a coil and a heat dissipation member due to component tolerances and assembly tolerances to achieve stable and good heat dissipation performance.

To solve the above problem, the present disclosure is a linear motor heat dissipation structure comprising: multiple teeth arranged linearly at predetermined intervals each with a coil wound around a rectangular tube-shaped bobbin; and a heat dissipation member provided between adjacent coils that dissipates heat generated in the coils by transmitting the heat to an external section, wherein the heat dissipation member is sandwiched by bowed sections of the coils that are curved outwards within edges of the rectangular tube-shaped bobbin due to elastic force of the coils.

With this heat dissipation structure, because a heat dissipation member provided between adjacent coils is sandwiched by bowed sections of the coils that are curved outwards within edges of the rectangular tube-shaped bobbin due to elastic force of the coils, even when there are component tolerances and assembly tolerances, those tolerances are absorbed by the elastic deformation of the bowed section of the coils such that the variance in the contact state (resistance to heat dissipation) between the coil and the heat dissipation member is made smaller so that stable and high heat dissipation performance is achieved.

Also, with the present disclosure, the heat dissipation member may be sandwiched such that the bowed section of the coil is pushed inwards by the heat dissipation member, by eliminating or forming into a recess shape the section between the edges of the rectangular tube-shape bobbin that sandwiches the heat dissipation member. Accordingly, because the elastic deformation amount (push-in amount) of the coils sandwiching the heat dissipation member is increased, contact between the coils and heat dissipation member is made stronger, the resistance to heat dissipation between the two is made smaller, such that the heat dissipation performance is improved considerably and the increase amount of the coil interval can be decreased by sandwiching the heat dissipation member between coils.

Further, with the present disclosure, the bow amount of the coils may be adjusted by adjusting the radius of curvature of the rounded edge section of the rectangular tube-shaped bobbin. For example, when the radius of curvature of the rounded edge section of the rectangular tube-shaped bobbin is made smaller, the bow amount by which the coil wound around the bobbin is elastically deformable is made larger, thus the leeway for absorbing component tolerances and assembly tolerances by elastic deformation of the coils is made larger, and the pushing force of the coils to the heat dissipation member becomes larger due to the elastic deformation amount of the coils sandwiching the heat dissipation member becoming larger. Conversely, when the radius of curvature of the rounded edge section of the rectangular tube-shaped bobbin is made bigger, the bow amount by which the coil wound around the bobbin is elastically deformable is made smaller, thus the leeway for absorbing component tolerances and assembly tolerances by elastic deformation of the coils is reduced, and the pushing force of the coils to the heat dissipation member is reduced due to the elastic deformation amount of the coils sandwiching the heat dissipation member being reduced.

DESCRIPTION OF EMBODIMENTS

A first, second, and third embodiment as three modes for carrying out the disclosure are described below.

First Embodiment

Figure 1:
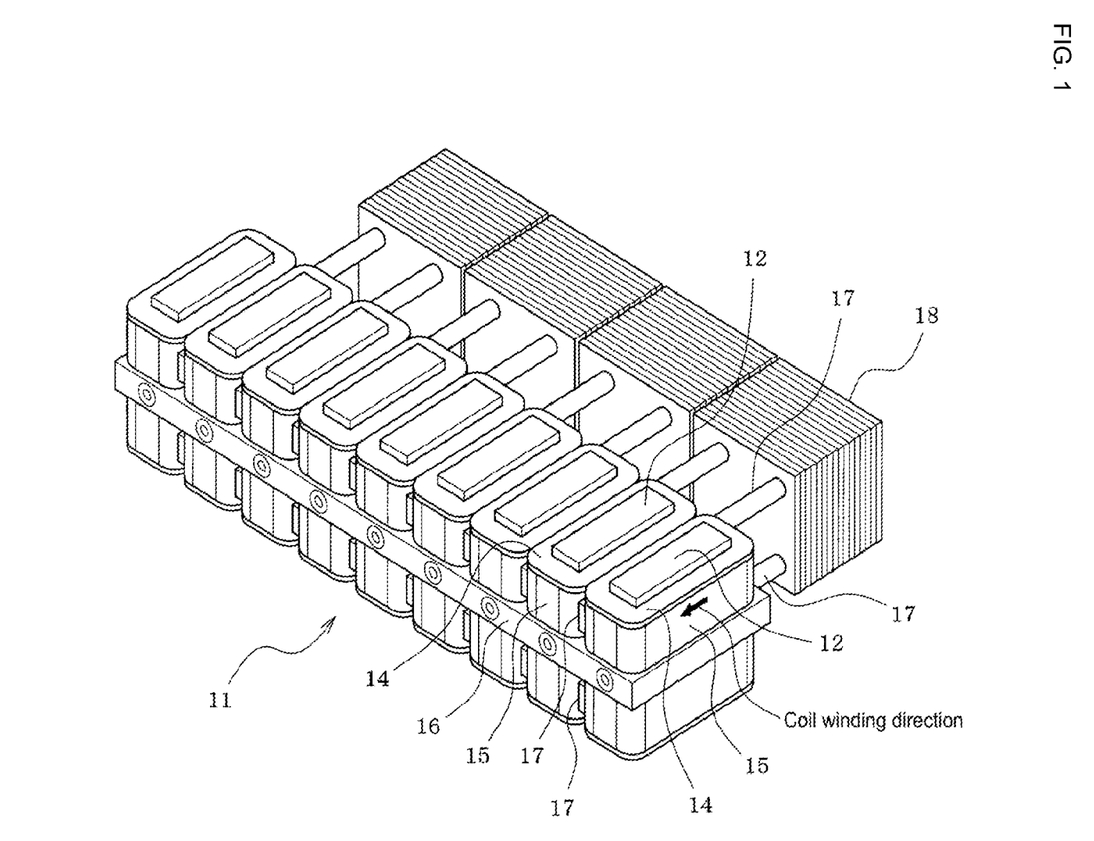
FIG. 1 is a perspective view showing the moving element of the linear motor of a first embodiment of the present disclosure.
Figure 2:
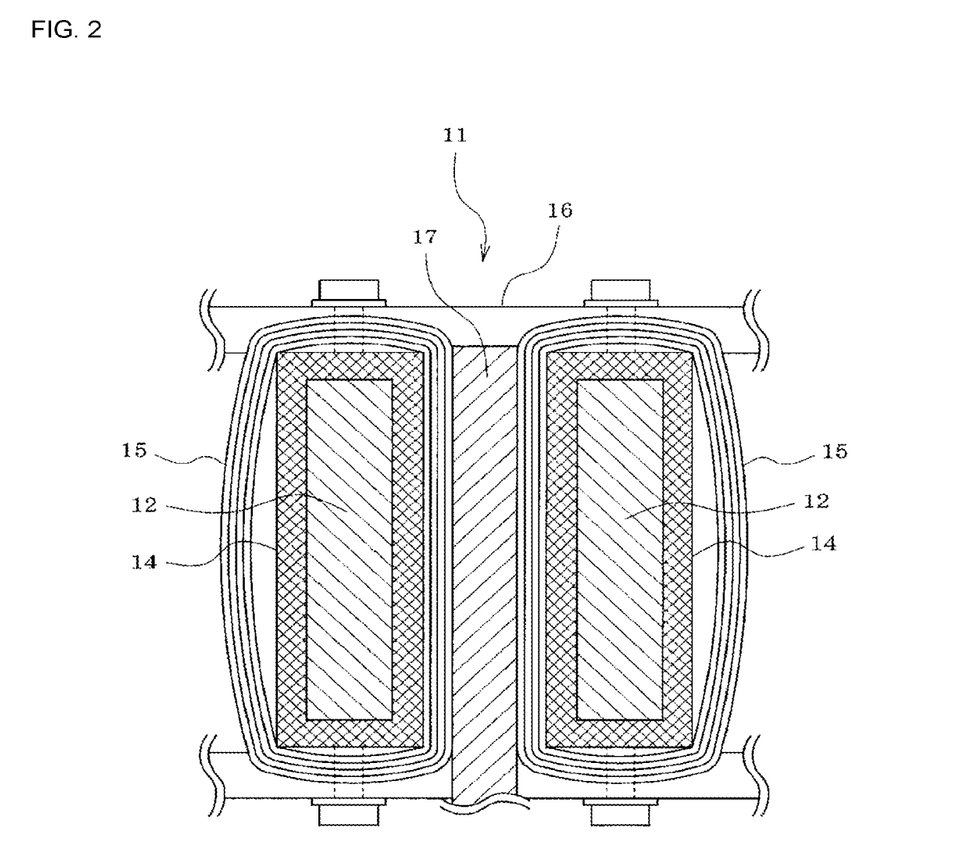
FIG. 2 is side view cross-section of the first embodiment showing a heat dissipation member sandwiched between coils.

The first embodiment is described with reference to FIGS. 1 to 4. As shown in FIGS. 1 and 2, moving element 11 of a linear motor is configured from multiple teeth 12 arranged linearly at predetermined intervals, with coil 15 wound around rectangular tube-shaped bobbin 14 mounted on each tooth 12 with the entire body thereof integrated by being fixed together in fixing frame 16. Note that, although not shown, the stator is configured with multiple permanent magnets arranged linearly on a core at a regular pitch with the poles alternating, and moving member 11 moves along these arranged permanent magnets of the stator.

Heat dissipation member 17 that dissipates heat generated in coils 15 by transmitting the heat to an external section is provided between adjacent coils 15. Heat dissipation member 17 is formed from a highly heat conductive member such as a heat pipe, and on a section of heat dissipation member 17 that protrudes to an outer side of moving member 17, heat dissipation fins 18 or a heat sink or the like are provided.

Figure 3A:
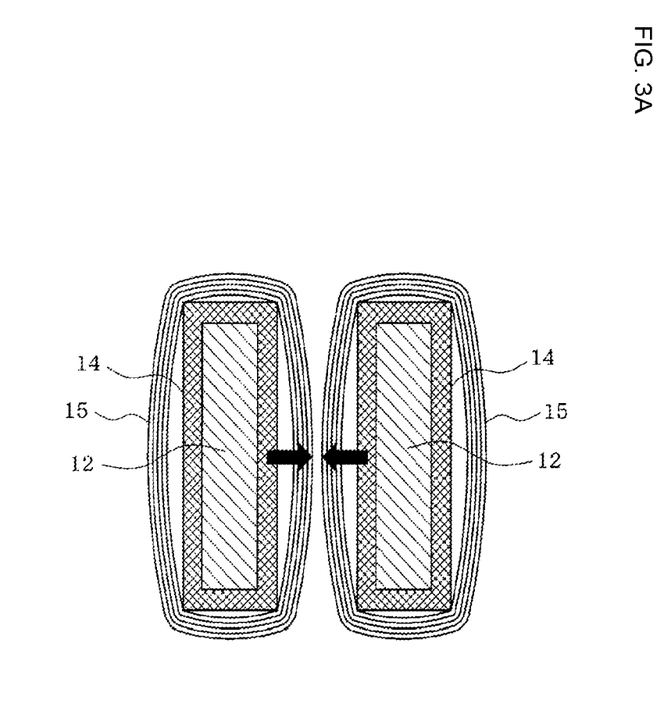
FIG. 3A is a side view cross-section of the first embodiment showing the state of the coils before the heat dissipation member is sandwiched.
Figure 3B:
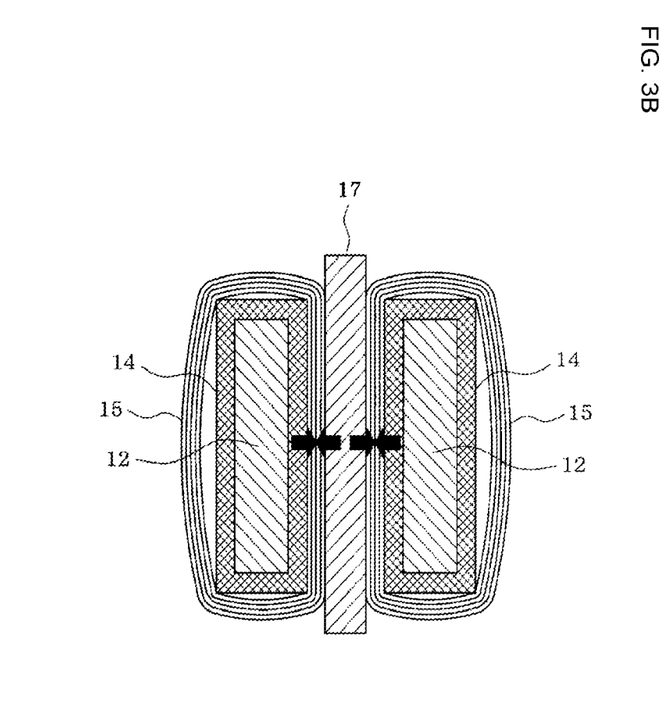
FIG. 3B is a side view cross-section of the first embodiment showing the state of the coils with the heat dissipation member sandwiched.

Coil 15 wound around rectangular tube-shaped bobbin 14, in a state before heat dissipation member 17 is sandwiched, as shown in FIG. 3, bows outwards in a curved shape within the edges of the rectangular tube-shaped bobbin due to elastic force of the coils, with the bowed sections of the coils able to push in (able to elastically deform) within the range of the bow amount (gap amount) of the coil. With the first embodiment, as shown in FIGS. 3A and 3B, the interval between each coil 15 is set as an interval at which sandwiched heat dissipation member 17 pushes the elastically deformable bowed section of each coil inwards. By this, as shown in FIG. 2 and FIG. 3B, heat dissipation member 17 sandwiched between each coil 15 elastically deforms the elastically deformable bowed section of each coil 15 so that the bowed section is pushed inwards, thus each coil 15 is held in a state firmly contacting the sides of heat dissipation member due to this elastic force.

Figure 4A:
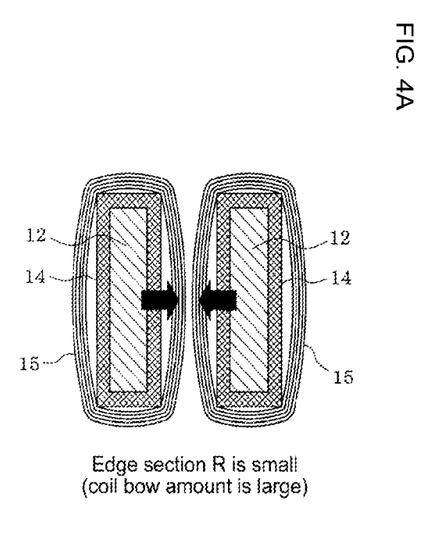
FIGS. 4A, 4B, and 4C are side view cross-sections illustrating the relationship between the radius of curvature of the rounded edge section of the rectangular tube-shaped bobbin and the bow amount of the coils in the first embodiment.
Figure 4B:
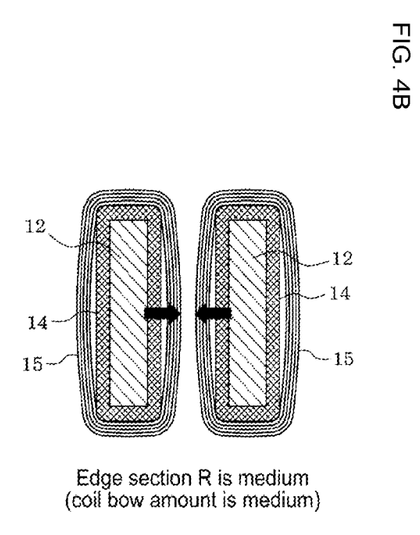
Figure 4C:
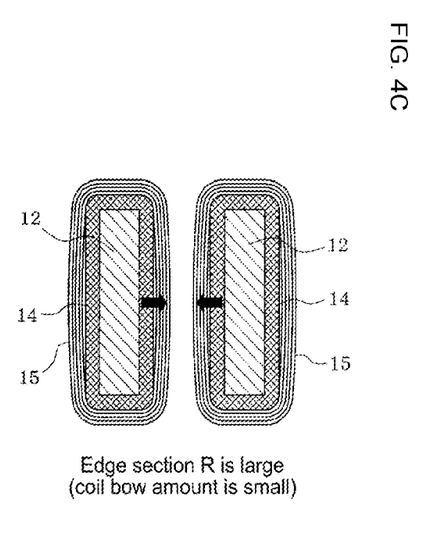

Further, with the first embodiment, as shown in FIG. 4, the bow amount (gap amount) of coil 15 is adjusted by adjusting the radius of curvature R of the rounded edge section of rectangular tube-shaped bobbin 14. For example, as shown in FIG. 4A, when the radius of curvature R of the rounded edge section of rectangular tube-shaped bobbin 14 is made smaller, the bow amount by which coil 15 wound around bobbin 14 is elastically deformable is made larger, thus the leeway for absorbing component tolerances and assembly tolerances by elastic deformation of coils 15 is made larger, and the pushing force of coils 15 to heat dissipation member 17 becomes larger due to the elastic deformation amount of coils 15 sandwiching heat dissipation member 17 becoming larger. Conversely, as shown in FIGS. 4B and 4C, when the radius of curvature R of the rounded edge section of rectangular tube-shaped bobbin 14 is made bigger, the bow amount by which coil 15 wound around bobbin 14 is elastically deformable is made smaller, thus the leeway for absorbing component tolerances and assembly tolerances by elastic deformation of coils 15 is reduced, and the pushing force of coils 15 to heat dissipation member 17 is reduced due to the elastic deformation amount of coils 15 sandwiching heat dissipation member 17 being reduced. Accordingly, the radius of curvature R of the rounded edge section of rectangular tube-shaped bobbin 14 may be determined considering factors such as the variance in the elastic coefficient of the wound wire of coil 15, component tolerances, assembly tolerances, and the pushing force of coils 15 on heat dissipation member 17 that is required.

With the linear motor heat dissipation structure of the first embodiment described above, because heat dissipation member 17 provided between adjacent coils 15 is sandwiched by bowed sections of coils 15 that are curved outwards within the edges of rectangular tube-shaped bobbin 14 due to elastic force of coils 15, even when there are component tolerances and assembly tolerances, those tolerances are absorbed by the elastic deformation of the bowed section of coils 15 such that the variance in the contact state (resistance to heat dissipation) between coils 15 and heat dissipation member 17 is made smaller so that stable and high heat dissipation performance is achieved.

Second Embodiment

Figure 5A:
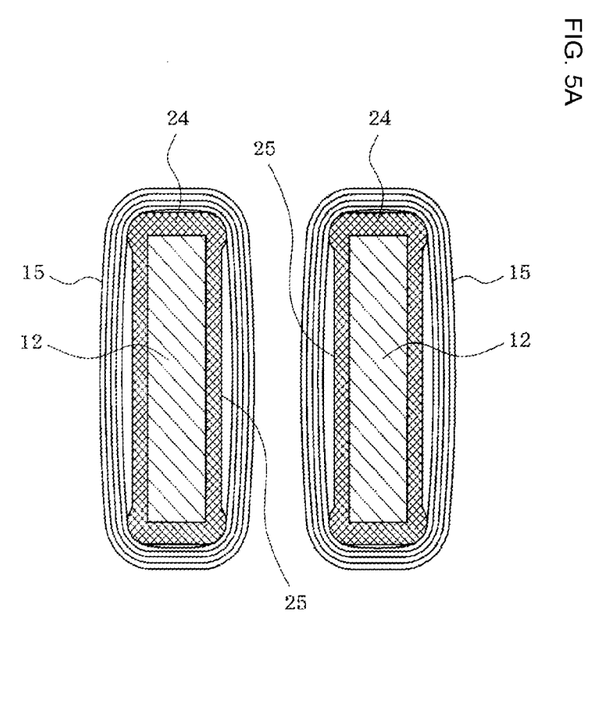
FIG. 5A is a side view cross-section of a second embodiment showing the state of the coils before the heat dissipation member is sandwiched.
Figure 5B:
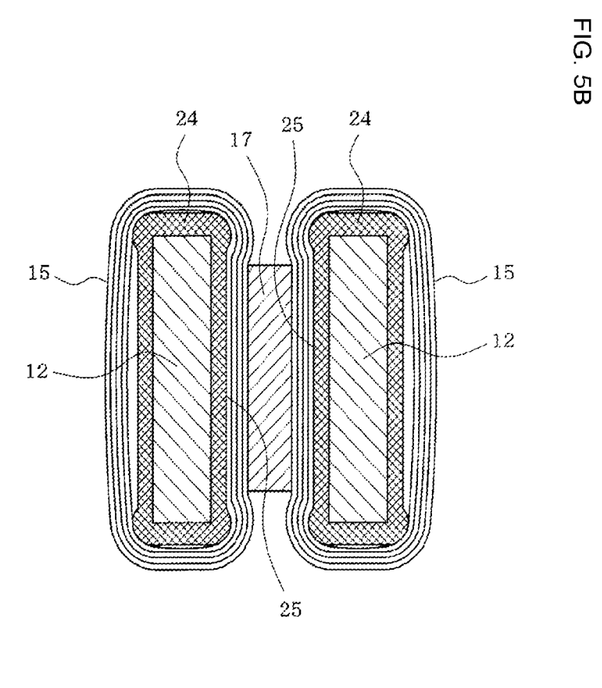
FIG. 5B is a side view cross-section of the second embodiment showing the state of the coils with the heat dissipation member sandwiched.

In a second embodiment, shown in FIG. 5, a portion of the sections of rectangular tube-shaped bobbin 24 between the edges of rectangular tube-shaped bobbin 24 within which heat dissipation member 17 is sandwiched is recessed, and heat dissipation member 17 is sandwiched such that the bowed sections of coils 15 are pushed inside recessed sections 25 of bobbins 24 by heat dissipation member 17. Other configurations are the same as the first embodiment.

With the second embodiment, the elastic deformation amount (push-in amount) of coils 15 that sandwich heat dissipation member 17 is increased by the recess amount of recessed sections 25 of bobbins 24, thus the leeway for absorbing component tolerances and assembly tolerances by elastic deformation of coils 15 is made larger, the pushing force of coils 15 to heat dissipation member 17 becomes larger due to the elastic deformation amount of coils 15 sandwiching heat dissipation member 17 becoming larger, resulting in smaller resistance to heat transfer between the two, thereby considerably improving heat dissipation performance. Further, the increase in the internal between coils 15 due to sandwiching heat dissipation member 17 between coils 15 is reduced by the recess amount of recessed sections 25 of bobbins 24, thus the linear motor is more compact than that of the first embodiment.

Third Embodiment

Figure 6A:
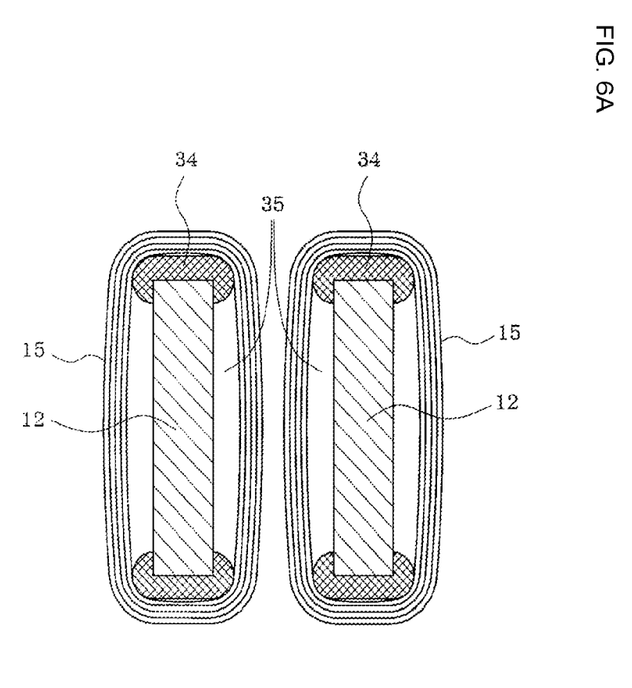
FIG. 6A is a side view cross-section of a third embodiment showing the state of the coils before the heat dissipation member is sandwiched.
Figure 6B:
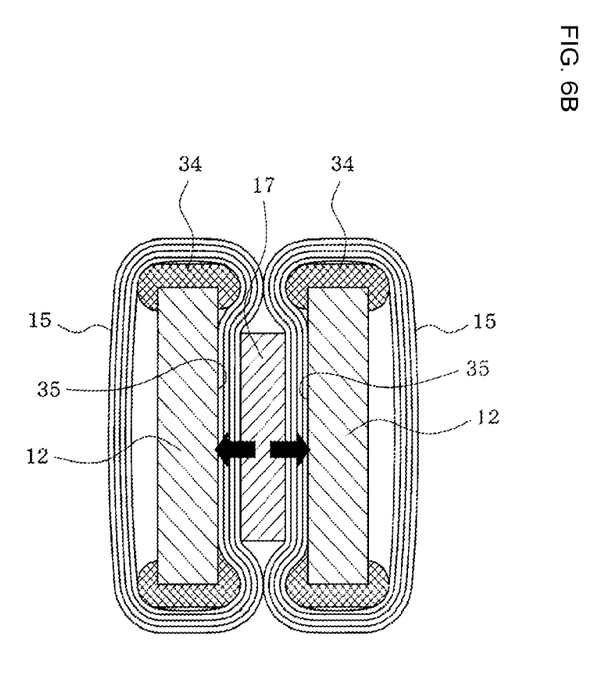
FIG. 6B is a side view cross-section of the third embodiment showing the state of the coils with the heat dissipation member sandwiched.

In a third embodiment, shown in FIG. 6, a portion of the sections of rectangular tube-shaped bobbin 34 between the edges of rectangular tube-shaped bobbin 34 within which heat dissipation member 17 is sandwiched is removed, and heat dissipation member 17 is sandwiched such that the bowed sections of coils 15 are pushed inside exposed sections 35 of bobbins 34 by heat dissipation member 17. Other configurations are the same as the first embodiment.

With the third embodiment, the amount by which coils 15 sandwiching heat dissipation member 17 are elastically deformable (push-in) is larger than in the first embodiment by the recessed amount of exposed section 35 of bobbin 34 (the thickness of bobbin 34), thus similar effects to the second embodiment are achieved.

REFERENCE SIGNS LIST

11: moving element; 12: tooth; 14: bobbin; 15: coil; 17: heat dissipation member; 18: heat dissipation fin; 24: bobbin; 25: recessed section; 34: bobbin; 35: opening

The invention claimed is:

1. A linear motor heat dissipation structure comprising:
multiple teeth arranged linearly at predetermined intervals each with a coil wound around a rectangular tube-shaped bobbin; and
a heat dissipation member provided between adjacent coils that dissipates heat generated in the coils by transmitting the heat to an external section,
wherein the heat dissipation member is sandwiched by bowed sections of the coils that are curved outwards within edges of the rectangular tube-shaped bobbin due to elastic force of the coils, and
wherein portions of the rectangular tube-shape bobbins between the edges of the rectangular tube-shape bobbins that sandwich the heat dissipation member are removed to create exposed sections, and the heat dissipation member is sandwiched such that the bowed sections of the coils are pushed inside the exposed sections of the rectangular tube-shape bobbins by the heat dissipation member.

2. The linear motor heat dissipation structure according to claim 1, wherein
the bow amount of the coil wound around the rectangular tube-shaped bobbin is adjusted by adjusting the radius of curvature of the rounded edge section of the rectangular tube-shaped bobbin.

3. The linear motor heat dissipation structure according to claim 1, wherein
the external section includes fins or a heat sink.

4. The linear motor heat dissipation structure according to claim 1, wherein
the heat dissipation member is formed from a heat pipe.

* * * * *